United States Patent
Ai (10) Patent No.: US 10,701,753 B2
(45) Date of Patent: Jun. 30, 2020

(54) METHOD AND DEVICE FOR CONTROLLING SET-UP OF USER-PLANE BEARER

(71) Applicant: CHINA ACADEMY OF TELECOMMUNICATIONS TECHNOLOGY, Beijing (CN)

(72) Inventor: Ming Ai, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 15/563,545

(22) PCT Filed: Mar. 22, 2016

(86) PCT No.: PCT/CN2016/076968
§ 371 (c)(1),
(2) Date: Sep. 29, 2017

(87) PCT Pub. No.: WO2016/155542
PCT Pub. Date: Oct. 6, 2016

(65) Prior Publication Data
US 2018/0092154 A1    Mar. 29, 2018

(30) Foreign Application Priority Data
Mar. 31, 2015  (CN) .......................... 2015 1 0149289

(51) Int. Cl.
*H04W 76/22* (2018.01)
*H04W 52/02* (2009.01)
(Continued)

(52) U.S. Cl.
CPC .......... *H04W 76/22* (2018.02); *H04W 24/04* (2013.01); *H04W 28/14* (2013.01);
(Continued)

(58) Field of Classification Search
CPC ... H04W 36/02; H04W 36/023; H04W 36/10; H04W 36/12
See application file for complete search history.

(56) References Cited

U.S. PATENT DOCUMENTS

2016/0073308 A1* 3/2016 Okabe .................. H04W 36/12
370/331
2016/0262041 A1* 9/2016 Ronneke ........... H04W 52/0216

FOREIGN PATENT DOCUMENTS

| CN | 101448249 | 6/2009 |
|----|-----------|--------|
| CN | 101568097 | 10/2009 |
| CN | 103238345 A | 8/2013 |
| CN | 103402187 A | 11/2013 |

(Continued)

OTHER PUBLICATIONS

PCT International Search Report for Counterpart PCT Application No. PCT/CN2016/076968, 5 pp. (including English translation), (dated Jun. 17, 2016).

(Continued)

*Primary Examiner* — Pao Sinkantarakorn
(74) *Attorney, Agent, or Firm* — Womble Bond Dickinson (US) LLP (57) ABSTRACT

Disclosed are a method and device for controlling set-up of a user side bearer, aiming to solve the problem of an unnecessary signaling overhead caused by the fact that a UE initiates a TAU process after an SGW deletes cached downlink data of the UE when a timer has timed out, and an MME still initiates a set-up process of a user side between the UE and a base station. The method comprises: in a tracking area updating (TAU) process, a mobility management entity (MME) determining that a serving gateway (SGW) needs to send cached downlink data to a terminal UE; and the MME initiating a set-up process of an air interface user side bearer of the UE.

8 Claims, 5 Drawing Sheets

(51) Int. Cl.
*H04W 24/04* (2009.01)
*H04W 28/14* (2009.01)
*H04W 76/12* (2018.01)
*H04W 36/00* (2009.01)
*H04W 92/24* (2009.01)

(52) U.S. Cl.
CPC ... *H04W 36/0033* (2013.01); *H04W 52/0216* (2013.01); *H04W 52/0229* (2013.01); *H04W 76/12* (2018.02); *H04W 92/24* (2013.01); *Y02D 70/00* (2018.01); *Y02D 70/1224* (2018.01); *Y02D 70/24* (2018.01)

(56) References Cited

FOREIGN PATENT DOCUMENTS

| CN | 103581888 A | 2/2014 |
|---|---|---|
| CN | 103945535 A | 7/2014 |
| EP | 2814289 A1 | 12/2014 |
| WO | WO2012034468 A1 | 3/2012 |
| WO | WO2014/182340 A1 | 11/2014 |

OTHER PUBLICATIONS

PCT Written Opinion of the International Searching Authority for Counterpart PCT Application No. PCT/CN2016/076968, 3 pp., (dated Jun. 17, 2016).

3GPP TR 23.709 V1.1.0 (Feb. 2015) Technical Report, 3rd Generation Partnership Project; Technical Specification Group Services and System Aspects; Study on Optimizations to Support High Latency Communications; Stage 2.

CN Office Action in patent application No. 201510149289.8 dated Dec. 29, 2018.

International Search Report and the Written Opinion of the International Searching Authority for International Application No. PCT/CN2011/078426 dated Mar. 22, 2012.

Office Action, KR10-2017-7030922OA1, dated Sep. 21, 2018.

EESR, PCT/CN2016076968, Application No. 16771297.5-1214 / 3280167, dated Apr. 4, 2018.

Tech Report vol. 3. (Feb. 2015), 3GPP Organizational Partners, "3rd Generation Partnership Project; Tech Spec Group Services & System Aspects; Study on Optimizations to Support High Latency Communications.".

SA WG2 Mtg #106 Temp Doc. S2-144112. Nov. 17, 2014 Alcatel-Lucent Shanghai Bell, "HLCOM Solution based on DL buffering in SGW.".

SA WG2 Mtg #106 Temp Doc. S2-144597. Nov. 17, 2014 Alcatel-Lucent Shanghai Bell, Ericsson, Qualcomm Inc., Samsung. "HLCOM Solution based on DL buffering in SGW.".

SA WG2 Mtg #107 Temp Doc. S2-150484. Jan. 30, 2015. Ericsson, Alcatel-Lucent, LG Electronics. "Clean-up of scenario A solutions.".

SA WG2 Mtg #109 Temp Doc. S2-151642. May 29, 2015. CATT. "Update to Solution 2: DL data buffering in S-GW or Gn-SGSN.".

* cited by examiner

METHOD AND DEVICE FOR CONTROLLING SET-UP OF USER-PLANE BEARER

CROSS-REFERENCE TO RELATED APPLICATIONS

This patent application is a U.S. National Phase Application under 35 U.S.C. § 371 of International Application No. PCT/CN2016/076963, filed on Mar. 22, 2016, which claims priority to and the benefit of Chinese Patent Application No, 201510149289.8, filed with the Chinese Patent Office on Mar. 31, 2015, and entitled "Method and apparatus for controlling a user-plane bearer to be established", which was incorporated by reference in its entirety.

FIELD

The present invention relates to the field of communications, and particularly to a method and apparatus for controlling a user-plane bearer to be established.

BACKGROUND

In machine communication, a terminal operates in a Power Saving Mode (PSM), an extended Discontinuous Reception (DRX) mode, or another mode for the purpose of saving power, where the extended DRX mode refers to an idle DRX mode with the longest periodicity of 10 seconds. The terminal operating in the power saving mode or the extended DRX mode may not respond to a downlink paging message in a timely manner, thus resulting in some transmission delay in transmission of service data.

The project "Communication with a High Delay" of the 3GPP SA2 working team is primarily focused on how user-plane data are transmitted over the network to the terminal while failing to respond to a downlink paging message in a timely manner. At present, there are a number of solutions proposed in TR23.709 including the solution 2 where generally a serving Gateway (SGW) buffers downlink data, and while the terminal is contacting the network, the SGW transmits the buffered data to the terminal through a relaying base station.

Figure 1:
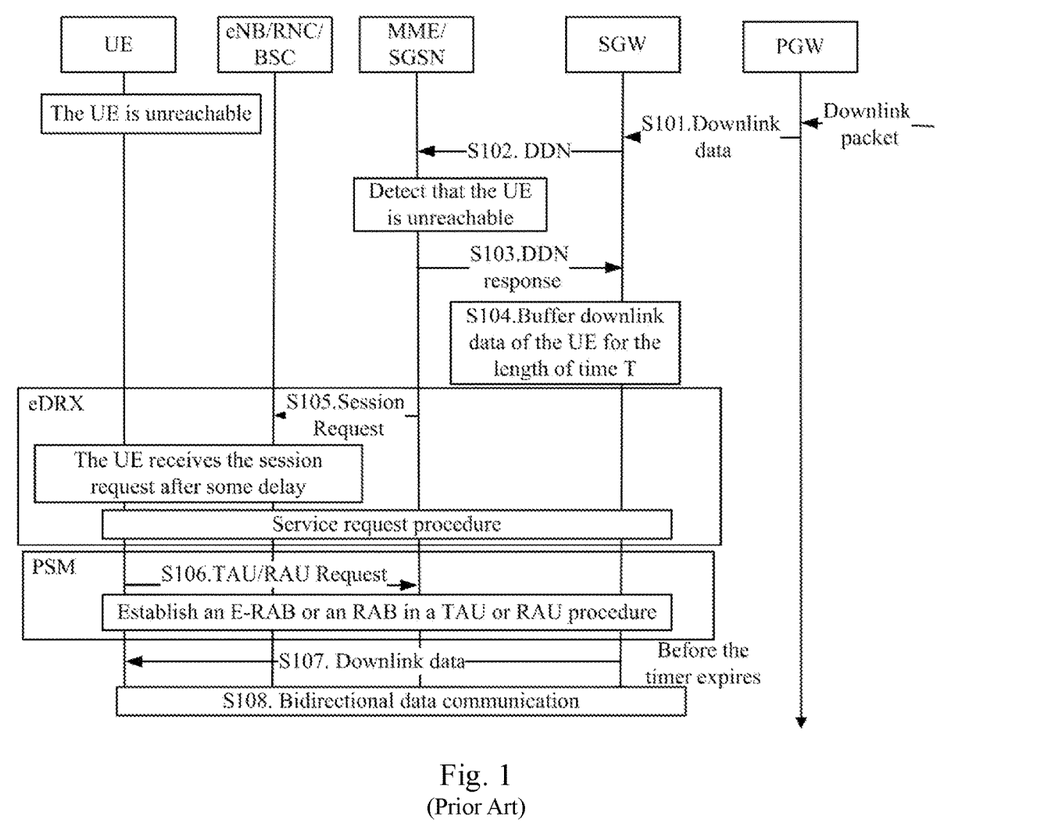
FIG. 1 is a schematic flow chart of the solution 2 in TR23.709.

As illustrated in FIG. 1, the solution 2 in TR23.709 is particularly as follows.

S101: The SGW receives downlink data of a Packet Data Gateway (PGW) to be transmitted to a specified User Equipment (UE).

S102: The SGW transmits a Downlink Data Notification (DDN) message to a Mobility Management Entity (MME) or a Serving General Packet Radio System (GPRS) Support Node (SGSN).

S103: The MME or the SGSN detecting the UE in the PSM, the extended DRX mode, or another temporarily unreachable state, the returns to the SGW a DDN Acknowledge (ACK) message carrying a request for buffering downlink data of the UE, and indicates a length of time T for which the SGW buffers the downlink data.

S104: The SGW buffers the downlink data for the UE according to the indication of the MME or the SGSN, and starts a timer S with the length of time T, that is, buffers the downlink data of the UE for the length of time T.

S105: The MME or the SGSN establishes a session with an evolved Node B (eNB) (or a Radio Network Controller (RNC) or a Base Station Controller (BSC)) serving the UE, the UE establishes a session with the eNB (or the RNC or the BSC), after some delay, and the UE initiates a Service Request procedure to the SGW.

S106: The UE initiates a Tracking Area Update (TAU) or a Routing Area Update (RAU) request to the MME or the SGSN, and an evolved Radio Access Bearer (E-RAB) or a Radio Access Bearer (RAB) is established between the UE and the SGW in the TAU or RAU procedure.

S107: The SGW transmits the buffered downlink data of the UE to the UE before the timer S expires, and the SGW deletes the buffered downlink data of the UE when the SGW detects that the timer S expires.

S108: Data are communicated bi-directionally between the UE and the SGW.

Here the MME or the SGSN initiates a paging procedure to the UE, and the UE initiates a service request procedure upon reception of a downlink paging message, and establishes a user-plane bearer with the network during the service request procedure, where the user-plane bearer includes two sections, i.e. one between the UE and the eNB, and the other one between the eNB and the SGW, and data can be transmitted between the UE and the network after the user-plane bearer is established. Since the UE operates in the PSM or the extended DRX mode, the UE which has entered the idle state fails to respond to a downlink paging message in a timely manner.

The MME indicates the SGW to buffer downlink data for the UE, and indicates the length of time T for which the SGW buffers the downlink data, when the MME detects the UE entering the PSM or the extended DRX mode. The SGW buffers the data for the UE according to the indication of the MME, and starts a timer S with the length of time T.

Before the timer S expires, the UE responds to paging by the network, or the UE which has data to be transmitted initiates the service request procedure on its own initiative, or the UE is in the TAU procedure, the SGW transmits the buffered data to the UE. The TAU procedure may be periodical, or may be triggered by the UE moving to a new Tracking Area (TA).

Here if the UE operates in the extended DRX mode, then the value of T will not be less than the periodicity of the extended DRX mode; and if the UE operates in the PSM, then the value of T will not be less than a remaining period of time before a periodical update procedure is initiated next time.

Here if the MME indicates the SGW to buffer downlink data of the UE, then the MME will pass the indication to a new MME in the TAU procedure. In the TAU interaction procedure between the UE and the network, the MME establishes a user-plane bearer for the UE, and also transmits a TAU Accept message.

Figure 2:
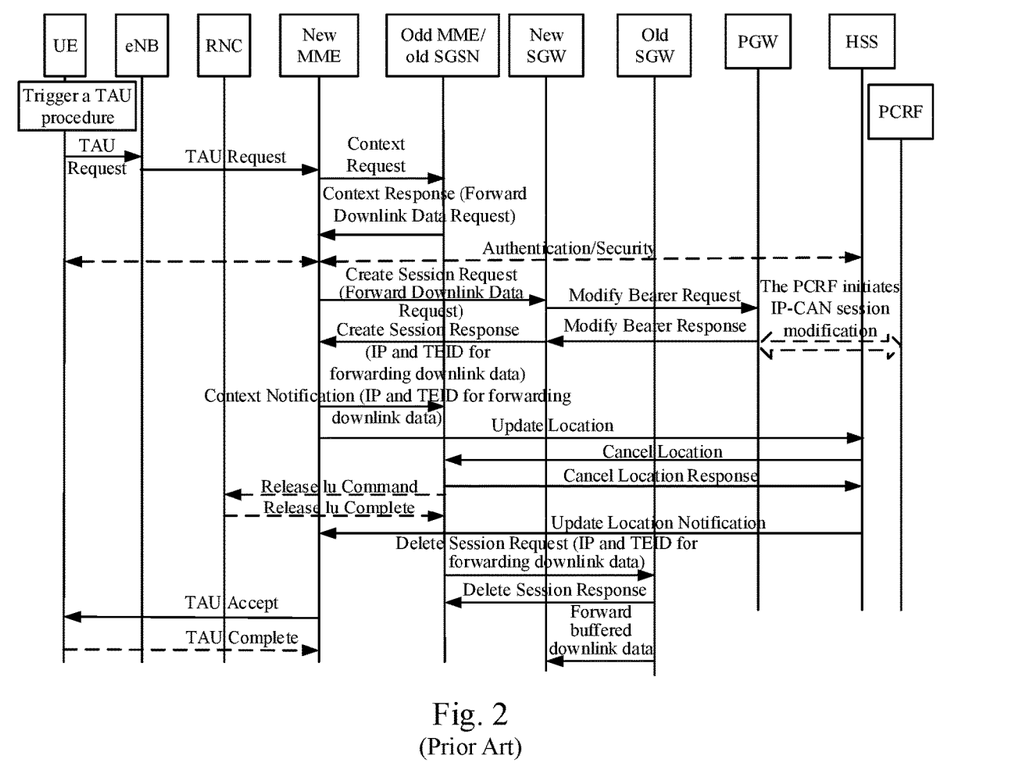
FIG. 2 is a schematic diagram of the TAU procedure initiated by the UE.

In the TAU procedure in TS23.401, if the UE needs to transmit user-plane data, then the UE will set an Active Flag in a TAU request message, and if the Active Flag is set in the TAU request message, then a user-plane establishment procedure will be performed, and also the TAU Accept message will be transmitted, as described in TS36.300. Particularly as illustrated in FIG. 2, in the TAU procedure, the MME or the SGSN before the update is enabled, referred to as the old MME or the old SGSN, carries a Downlink Data Forward Request in a context response message transmitted to the new MME which is updated during the TAU procedure, where the request indicates downlink data to be forwarded. The new SGW carries an IP address and a Tunneling Endpoint Identifier (TEID) of a User Plane Part of GPRS Tunneling Protocol (GTP) which are allocated for forwarding of downlink data, in a Session Establish Response message transmitted to the new MME, where the IP address and the TEID are passed to the old SGW which is not updated in a subsequent TAU interaction procedure. The old SGW forwards the buffered downlink data to the new SGW according to the IP address and the TEID. After all the data are transmitted, a data packet carrying an end indication is transmitted to the new SGW, where the end indication indicates that all the downlink data to be forwarded have been transmitted.

In the TAU procedure, it is only indicated that the UE needs to set an Active Flag, and the network establishes a user-plane bearer for the UE during the TAU procedure according to the Active Flag, and the network can perform an operation combining the establishment of the user-plane bearer and the transmission of the TAU Accept message.

In TS23.709, the UE may not contact with the network before the timer S expires, due to an unpredictable network condition, and after the timer S expires, if the SGW has deleted the buffered downlink data of the UE, and the UE has initiated an TAU procedure, and has no data to be transmitted to the network, then if the MME initiates a user-plane establishment procedure between the UE and the eNB, and the SGW has no downlink data to be transmitted, then there may be an unnecessary signaling overhead.

SUMMARY

Embodiments of the invention provide a method and apparatus for controlling a user-plane bearer to be established so as to address the problem in the prior art that when the timer expires, if the SGW deletes the buffered downlink data of the UE, and the UE initiates the TAU procedure, but the MME initiates the user-plane establishment procedure between the UE and the eNB, then there may be an unnecessary signaling overhead.

Particular technical solutions according to the embodiments of the invention are as follows.

In a first aspect, there is a method for controlling a user-plane bearer to be established, the method including: determining, by a Mobility Management Entity (MME), that a Serving Gateway (SGW) needs to transmit buffered downlink data to a User Equipment (UE), in a Tracking Area Update (TAU) procedure; and initiating, by the MME, a procedure of establishing a user-plane bearer for the UE.

Preferably determining, by the MME, that the Serving Gateway (SGW) needs to transmit buffered downlink data to the User Equipment (UE) includes: obtaining, by the MME, an indication that the SGW needs to transmit buffered downlink data to the UE, and determining that the SGW needs to transmit buffered downlink data to the UE, according to the indication; or determining, by the MME, that a local timer does not expire, wherein the timer is started by the MME when the MME indicates the SGW to buffer downlink data of the UE in a case of determining that the UE is unreachable, and the length of the timer decided according to the length of time T for which the MME indicates the SGW to buffer downlink data of the UE; or determining, by the MME, a time of receiving a Context Request message of a new MME which is relocated, is earlier than a recorded timestamp, the recorded timestamp is determined by the MME from a length of time for which the MME indicates the SGW to buffer downlink data of the UE in a case of determining that the UE is unreachable; or the recorded timestamp is a sum of a time when the MME indicates the SGW to buffer downlink data of the UE in a case of determining that the UE is unreachable, and a length of time for which the MME indicates the SGW to buffer downlink data of the UE; or determining, by the MME, that a time when a bearer related message of the SGW is received is earlier than a recorded timestamp, which is determined by the MME from a length of time for which the MME indicates the SGW to buffer downlink data of the UE in a case of determining that the UE is unreachable; or which is a sum of a time when the MME indicates the SGW to buffer downlink data of the UE in a case of determining that the UE is unreachable, and a length of time for which the MME indicates the SGW to buffer downlink data of the UE.

Preferably if the MME is changed in the TAU procedure, then the method further includes: if the MME determines that the local timer does not expire, then transmitting the indication that the SGW needs to transmit buffered downlink data to the UE, to a new MME after the change, so that the new MME initiates the procedure of establishing a user-plane bearer for the UE; or if the MME determines that a stored timestamp does not expire, then transmitting the indication that the SGW needs to transmit buffered downlink data to the UE, to a new MME after the change, so that the new MME initiates the procedure of establishing a user-plane bearer for the UE.

Preferably if the MME is a new MME in the TAU procedure, then obtaining, by the MME, the indication that the SGW needs to transmit buffered downlink data to the UE includes: receiving, by the MME, an indication that the SGW needs to transmit buffered downlink data to the UE, the indication is transmitted by an old MME in the TAU procedure upon determining that a local timer does not expire; or receiving, by the MME, an indication that the SGW needs to transmit buffered downlink data to the UE, the indication is transmitted by an old MME in the TAU procedure upon determining that the SGW needs to transmit buffered data.

Preferably the indication that the SGW needs to transmit buffered downlink data to the UE is carried in a Modify Bearer Response message of the SGW.

In a second aspect, there is a method for controlling a user-plane bearer to be established, the method including: determining, by a Serving Gateway (SGW), that there is buffered downlink data of a User Equipment (UE); and transmitting, by the SGW, to a Mobility Management Entity (MME) an indication that buffered downlink data need to be transmitted to the UE.

Preferably determining, by the SGW, that there is buffered downlink data of the UE includes: determining, by the SGW, that a local timer does not expire, wherein the operating length of the timer is transmitted by the MME when the MME determines that the UE is unreachable, and the timer is started upon reception of an indication for buffering downlink data for the UE; or determining, by the SGW, downlink data in a local buffer to be transmitted to the UE.

Preferably the indication that buffered downlink data need to be transmitted to the UE is carried in a Modify Bearer Response message transmitted to the MME.

In a third aspect, there is a Mobility Management Entity (MME) including: a determining module configured to determine that a Serving Gateway (SGW) needs to transmit buffered downlink data to a User Equipment (UE), in a Tracking Area Update (TAU) procedure; and an initiating module configured to initiate a procedure of establishing a user-plane bearer for the UE.

Preferably the determining module is configured: to obtain an indication that the SGW needs to transmit buffered downlink data to the UE, and to determine that the SGW needs to transmit buffered downlink data to the UE, according to the indication; or to determine that a local timer does not expire, wherein the timer is started by the MME when the MME indicates the SGW to buffer downlink data of the UE in a case of determining that the UE is unreachable, and a timing length of the timer is a length of time T for which the MME indicates the SGW to buffer downlink data of the UE; or to determine that the time when a Context Request message of a new MME after relocation is received is earlier than a recorded timestamp, which is determined by the MME from a length of time for which the MME indicates the SGW to buffer downlink data of the UE in case of determining that the UE is unreachable; or which is the sum of a time when the MME indicates the SGW to buffer downlink data of the UE in case of determining that the UE is unreachable, and, and the length of time for which the MME indicates the SGW to buffer downlink data of the UE; or to determine that the time when a bearer related message of the SGW is received is earlier than a recorded timestamp, which is determined by the MME from a length of time for which the MME indicates the SGW to buffer downlink data of the UE in case of determining that the UE is unreachable; or which is a sum of the time when the MME indicates the SGW to buffer downlink data of the UE in case of determining that the UE is unreachable, and the length of time for which the MME indicates the SGW to buffer downlink data of the UE.

Preferably the MME further includes a transmitting module configured: if the MME is changed in the TAU procedure, and it is determined that the local timer does not expire, to transmit the indication that the SGW needs to transmit buffered downlink data to the UE, to a new MME after the change, so that the new MME initiates the procedure of establishing a user-plane bearer for the UE; or if the MME is changed in the TAU procedure, and it is determined that a stored timestamp does not expire, to transmit the indication that the SGW needs to transmit buffered downlink data to the UE, to a new MME after the change, so that the new MME initiates the procedure of establishing a user-plane bearer for the UE.

Preferably the MME further includes a receiving module configured: if the MME is a new MME in the TAU procedure, to receive an indication that the SGW needs to transmit buffered downlink data to the UE, wherein the indication is transmitted by an old MME in the TAU procedure upon determining that a local timer does not expire; or if the MME is a new MME in the TAU procedure, to receive an indication that the SGW needs to transmit buffered downlink data to the UE, wherein the indication is transmitted by an old MME in the TAU procedure upon determining that the SGW needs to transmit buffered data.

Preferably the indication that the SGW needs to transmit buffered downlink data to the UE is carried in a Modify Bearer Response message of the SGW.

In a fourth aspect, there is a Serving Gateway (SGW) including: a determining module configured to determine that there is buffered downlink data of a User Equipment (UE); and a transmitting module configured to transmit to a Mobility Management Entity (MME) an indication that buffered downlink data need to be transmitted to the UE.

Preferably the determining module is configured: to determine that a local timer does not expire, wherein the operating length of the timer is transmitted by the MME when the MME determines that the UE is unreachable, and the timer is started upon reception of an indication for buffering downlink data for the UE; or to determine that there is downlink data to be transmitted to the UE in a local buffer.

Preferably the indication that buffered downlink data need to be transmitted to the UE is carried in a Modify Bearer Response message transmitted to the MME.

With the technical solutions above according to the embodiments of the invention, if the MME determines that the SGW needs to transmit buffered downlink data to the UE, in the TAU procedure, then the MME will initiate a procedure of establishing a user-plane bearer for the UE, thus avoiding the MME from initiating a user-plane establishment procedure between the UE and the eNB for transmitting downlink data of the UE buffered by the SGW, in the TAU procedure initiated by the UE after the downlink data of the UE buffered by the SGW is lost, so as to avoid an unnecessary signaling overhead.

DETAILED DESCRIPTION OF THE EMBODIMENTS

In order to make the objects, technical solutions, and advantages of the invention more apparent, the invention will be described below in further details with reference to the drawings, and apparently the embodiments described below are only a part but not all of the embodiments of the invention. Based upon the embodiments here of the invention, all the other embodiments which can occur to those ordinarily skilled in the art without any inventive effort shall fall into the scope of the invention.

Figure 3:
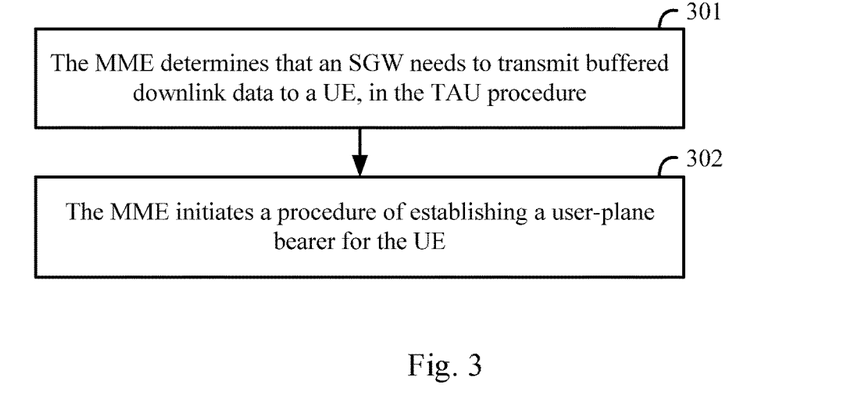
FIG. 3 is a schematic flow chart of a method for controlling by an MME a user-plane bearer to be established, according to an embodiment of the invention.

As illustrated in FIG. 3, a particular flow of a method for controlling by an MME a user-plane bearer to be established, in a TAU procedure according to an embodiment of the invention is as follows.

In the step 301, the MME determines that an SGW needs to transmit buffered downlink data to a UE, in the TAU procedure.

In the step 302, the MME initiates a procedure of establishing a user-plane bearer for the UE so as to transmit the downlink data of the UE buffered by the SGW over the established user-plane bearer.

In an implementation, the MME determines whether the SGW needs to transmit downlink data to the UE, in the TAU procedure, and if so, then the MME will initiate a procedure of establishing a user-plane bearer for the UE so as to transmit the downlink data to the UE over the user-plane bearer; otherwise, if the UE does not need to transmit any uplink data either in the TAU procedure, then the MME will not initiate any procedure of establishing a user-plane bearer for the UE.

Here the MME determines that the SGW needs to transmit buffered downlink data to the UE, in the TAU procedure in the following several implementations without any limitation thereto.

In a first implementation, the MME obtains an indication that the SGW needs to transmit buffered downlink data to the UE, and determines that the SGW needs to transmit buffered downlink data to the UE, according to the indication.

Particularly the indication that buffered downlink data need to be transmitted to the UE is carried in a Modify Bearer Response message of the SGW.

In an implementation, the MME receives the Modify Bearer Response message returned by the SGW in response to a Modify Bearer Request of the MME, and if it is determined that the Modify Bearer Response message carries the indication that buffered downlink data need to be transmitted to the UE, then the MME will trigger establishment of a user-plane bearer for the UE; or if it is determined that the Modify Bearer Response message does not carry any indication that buffered downlink data need to be transmitted to the UE, then the MME will not trigger establishment of any user-plane bearer for the UE.

The first implementation is particularly applicable to a scenario where neither MME nor SGW is changed (or relocated) in the TAU procedure.

In a second implementation, the MME determines that a local timer M does not expire, where the timer M is started by the MME when the MME indicates the SGW to buffer downlink data of the UE in a case of determining that the UE is unreachable, and a timing length of the timer is not less than a length of time T for which the MME indicates the SGW to buffer downlink data of the UE, that is, the timing length is equal to or slightly more than T.

Particularly the MME detects that the UE is unreachable, according to a DDN message of the SGW, and returns to the SGW a DDN ACK message carrying the request for buffering downlink data of the UE, and the length of time T for which the SGW is indicated to buffer downlink data of the UE, and the MME starts locally the timer M with the timing length of time T into operation. It shall be noted that the timing length of the timer operated by the MME is equal to or slightly more than a timing length T of a timer started into operation by the SGW according to the DDN response returned by the MME.

It shall be noted in the process above, the MME can determine whether the SGW needs to transmit buffered downlink data to the UE in the TAU procedure, by recording a timestamp instead of starting locally the timer M with the timing length T into operation, that is, when the MME determines that the UE is unreachable and indicates the SGW to buffer downlink data of the UE for the timing length T, and the MME determines a timestamp $T_S$ from T; and particularly the MME determines the timestamp $T_S$ as the current time to which the timing length T is added. Before the time reaches $T_S$, the MME can determine that the SGW buffers downlink data of the UE, and needs to transmit them to the UE. After the time reaches $T_S$, that is, after $T_S$ expires, the MME can determine that no buffered data need to be transmitted. In the embodiments of the invention, the timer and the timestamp may be used interchangeably.

In an implementation, if the MME determines that the local timer M does not expires, in the TAU procedure, then the MME will know that the SGW still buffers downlink data of the UE, and then determine that the SGW needs to transmit the buffered downlink data to the UE; or if the MME determines that the local timer M has expired, then the MME will know that the downlink data of the UE buffered by the SGW has been deleted or discarded by the SGW, and then determine that the SGW does not need to transmit any buffered downlink data to the UE, so the MME does not need to initiate any procedure of establishing a user-plane bearer for the UE.

In this implementation, if the MME is changed in the TAU procedure, then if the old MME before this change in the TAU procedure determines that the local timer M does not expire, then the old MME will transmit an indication to the new MME after the change that the SGW needs to transmit buffered downlink data to the UE.

The new MME in the TAU procedure obtains the indication that the SGW needs to transmit buffered downlink data to the UE, particularly by receiving the indication that the SGW needs to transmit buffered downlink data to the UE, wherein the indication is transmitted by the old MME in the TAU procedure.

In an implementation, if the MME is changed in the TAU procedure, then a new MME after the change will transmit a Context Request message to the old MME before the change.

If the old MME determines that the local timer M does not expire, then the old MME will carry an indication that the SGW needs to transmit buffered downlink data to the UE, in a Context Response message returned to the new MME after the change.

The new MME receives the Context Response message returned by the old MME, and if the new MME determines that the Context Response message carries the indication that the SGW needs to transmit buffered downlink data to the UE, then the new MME will initiate a procedure of establishing a user-plane bearer for the UE; otherwise, the new MME will not initiate any procedure of establishing a user-plane bearer for the UE unless the UE indicates in the TAU request message that there are uplink data to be transmitted (that is, the Active Flag is set).

The second implementation is particularly applicable to a scenario where no SGW is changed in the TAU procedure.

In a third implementation, if the MME is changed, then the old MME will determine that the time when a Context Request message of a new MME after relocation is received is earlier than a recorded timestamp, which is determined by the old MME from the length of time for which the old MME indicates the SGW to buffer downlink data of the UE in a case of determining that the UE is unreachable; or which is the sum of the time when the old MME indicates the SGW to buffer downlink data of the UE in a case of determining that the UE is unreachable, and the length of time for which the old MME indicates the SGW to buffer downlink data of the UE.

In a fourth implementation, the MME determines that the time when a bearer related message of the SGW is received is earlier than a recorded timestamp, which is determined by the MME from the length of time for which the MME indicates the SGW to buffer downlink data of the UE in a case of determining that the UE is unreachable; or which is the sum of the time when the MME indicates the SGW to buffer downlink data of the UE in a case of determining that the UE is unreachable, and the length of time for which the MME indicates the SGW to buffer downlink data of the UE.

Figure 4:
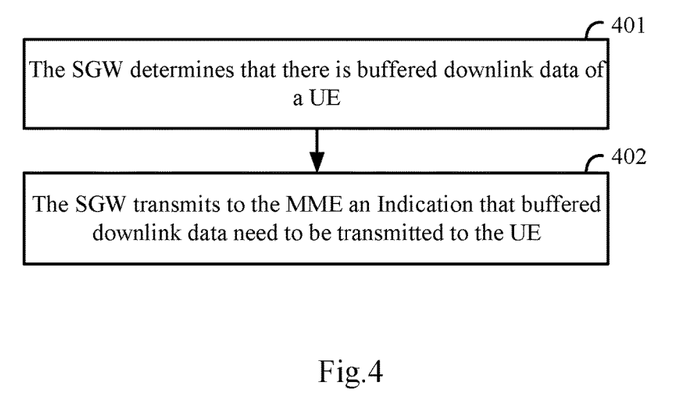
FIG. 4 is a schematic flow chart of a method for controlling by an SGW a user-plane bearer to be established, according to an embodiment of the invention.

Based upon the same inventive idea, as illustrated in FIG. 4, a particular flow of a method for controlling by an SGW a user-plane bearer to be established is as follows.

Step 401: The SGW determines that there are buffered downlink data of a UE.

Particularly the SGW determines that there are buffered downlink data of the UE in the following implementations without any limitation thereto.

In a first implementation, the SGW determines that a local timer S does not expire, where the operating time of the timer is transmitted by the MME when the MME determines that the UE is unreachable, and the timer is started upon reception of an indication for indicating the SGW to buffer downlink data of the UE. If the SGW determines that the timer S has expired, then it will indicate that data in a buffer have been deleted, or the data in the buffer do not need to be transmitted.

Particularly the SGW receives a DDN response message returned by the MME after transmitting a DDN message to the MME, where the DDN response message carries a request for buffering downlink data of the UE, and indicates the length of time T for which the SGW buffers downlink data of the UE, and the SGW buffers downlink data of the UE in response to the request for buffering downlink data of the UE, and starts the timer S into operation with the length of time T being a timing length.

In a second implementation, the SGW determines that there are downlink data to be transmitted to a UE in a local buffer.

The SGW checks directly the buffer for buffered data.

This is merely an example, but any other methods in the SGW for determining whether there is downlink data of the UE in the buffer will be applicable to the invention.

Step 402: The SGW transmits to the MME an indication that buffered downlink data need to be transmitted to the UE.

Particularly the indication that buffered downlink data need to be transmitted to the UE is carried in a Modify Bearer Response message transmitted by the SGW to the MME.

Figure 5:
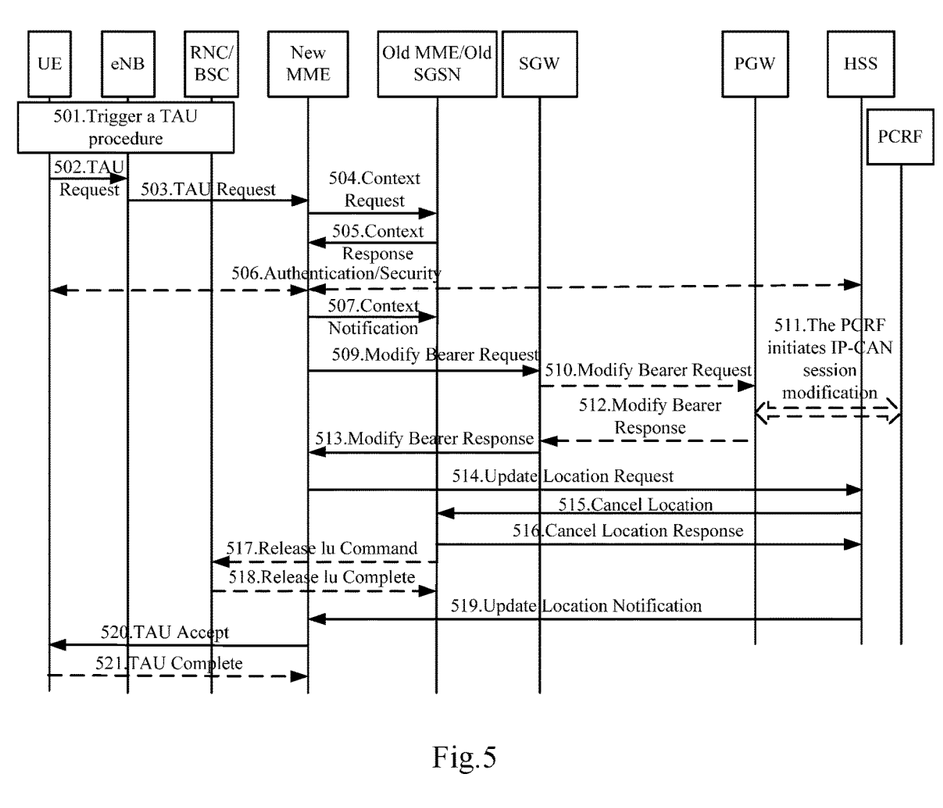
FIG. 5 is a schematic diagram of a TAU procedure initiated by a UE according to an embodiment of the invention.

In a particular embodiment, FIG. 5 illustrates a particular TAU procedure initiated by a UE to an MME or an SGSN, where no SGW is relocated in the TAU procedure, and the TAU procedure is particularly as follows.

Step 501: The UE triggers the TAU procedure through a serving eNB/RNC/BSC, where although the following steps are described taking an eNB serving the UE as an example, it shall be noted that the eNB in the following steps may be replaced with an RNC or a BSC.

Step 502: The UE transmits a TAU request to the eNB.

Step 503: The eNB transmits the TAU request of the UE to a new MME, where in this embodiment, the eNB selects such a MME for routing the TAU request message that is different from a MME with which the UE was registered, and the MME is referred to as a new MME.

Step 504: The new MME transmits a Context Request to the old MME, or an old SGSN, with which the UE was registered, where the old SGSN is a SGSN operating with an S4 interface, or a SGSN operating with a gn/gp interface.

Step 505: The old MME or the old SGSN returns a Context Response to the new MME. Step 506: Optionally a Home Subscriber Server (HSS) performs identity authentication and/or security authentication on the UE.

Step 507: The new MME transmits a Context Acknowledge to the old MME.

Step 509: The new MME transmits a Modify Bearer Request to the SGW.

Step 510: The SGW transmits the Modify Bearer Request to a PGW.

Step 511: A Policy and Charging Enforcement Function (PCRF) initiates an Internet Protocol (IP) Connectivity Access Network (IP-CAN) session modification procedure.

Step 512: The SGW receives a Modify Bearer Response message returned by the PGW.

Step 513: The SGW returns the Modify Bearer Response message to the new MME.

Step 514: The new MME transmits an Update Location Request message to the HSS.

Step 515: The old MME or the old SGSN receives a Cancel Location indication message transmitted by the HSS.

Step 516: The old MME or the old SGSN returns a Cancel Location Response message to the HSS.

If the RNC or the BSC serves the UE, then the flow will proceed to the step 517 and the step 518; otherwise, the flow will skip the step 517 and the step 518.

Step 517: The RNC or the BSC serving the UE receives a Release Iu interface Command of the old MME.

Step 518: The RNC or the BSC serving the UE returns a Release Iu interface Complete message to the old MME or the old SGSN.

Step 519: The HSS transmits a Update Location ACK to the new MME.

Step 520: The new MME transmits a TAU Accept message to the UE.

Step 521: Optionally the UE returns a TAU Complete message to the new MME after the TAU update procedure is completed.

In a first implementation, in the step 513, if the SGW determines that there is locally stored downlink data of the UE, then an indication that the SGW needs to transmit buffered downlink data to the UE will be carried in the Modify Bearer Response message, where the indication may be represented as "There is buffered downlink data", or "There is a need for establishing a user plane", etc.; and if the new MME determines that the Modify Bearer Response message of the SGW carries the indication, upon reception of the Modify Bearer Response message, then the new MME will trigger a procedure of establishing a user plane for the UE. For example, the procedure of establishing a user plane is performed, and also the TAU Accept message is transmitted.

In a second implementation, before the UE initiates the TAU procedure, the old MME starts a timer M locally after determining the length of time T for which the SGW buffers downlink data of the UE, and indicating it to the SGW in the DDN ACK message, where the timing length of the timer is also T.

While the UE is initiating the TAU procedure, if the MME is changed in the TAU procedure, then in the step 505, the old MME will firstly determine whether the local timer M expires, and if so, then the old MME will not carry any indication that the SGW needs to transmit buffered downlink data to the UE, in the context response transmitted to the new MME; otherwise, the old MME will carry the indication that the SGW needs to transmit buffered downlink data to the UE, in the context response transmitted to the new MME.

In a third implementation, the MME records a timestamp ts, the value of which is the time, when the DDN ACK message is transmitted to the SGW, to which the length of time T is added, that is, the MME determines the timestamp ts as a function of the length of time T, transmitted by the MME to the SGW, for which the SGW buffers the data. In the TAU procedure in which the MME is changed, if the time when a Context Request message from the new MME is received is earlier than ts, that is, ts does not expire, then it will be determined that the SGW needs to transmit buffered data; or if the time when a Context Request message from the new MME is received is later than ts, that is, ts has expired, then it will be determined that the SGW does not need to transmit buffered data. In the TAU procedure in which no MME is changed, if the time when a bearer related message from the SGW is received is earlier than ts, that is, ts does not expire, then it will be determined that the SGW needs to transmit buffered data; or if the time when a bearer related message from the SGW is later than ts, that is, ts has expired, then it will be determined that the SGW does not need to transmit buffered data.

If no SGW is changed in the TAU procedure, then the new MME will trigger a procedure of establishing a user plane for the UE subsequent to the step 505.

If the SGW is changed (that is, the SGW is reallocated) in the TAU procedure, then as illustrated in FIG. 2, if the new SGW in the TAU procedure carries an IP address, and a TEID of GTP-U, allocated for forwarding downlink data, in a Create Session Response message transmitted to the new MME, then the new MME will trigger a procedure of establishing a user plane for the UE.

Figure 6:
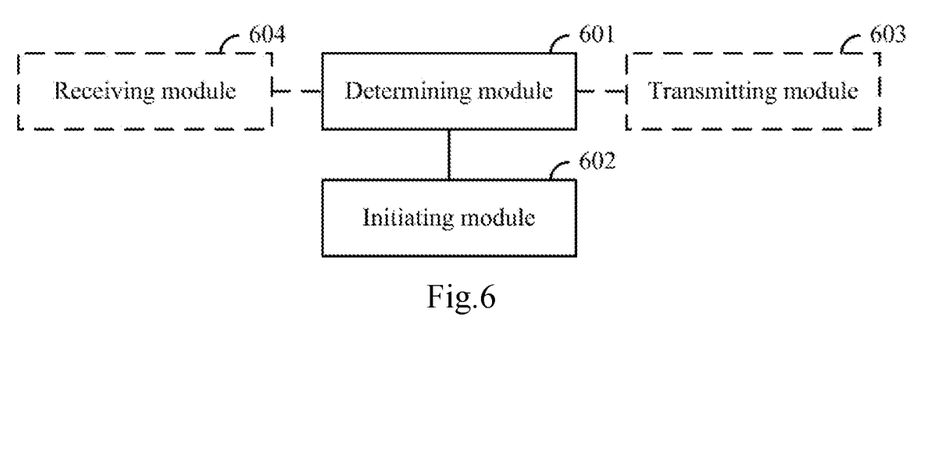
FIG. 6 is a schematic structural diagram of an MME according to an embodiment of the invention.

Based upon the same inventive idea, an embodiment of the invention further provides a MME, and for a particular implementation of the MME, reference can be made to the description of the MME in the embodiments of the methods above, so a repeated description thereof will be omitted here. As illustrated in FIG. 6, the MME generally includes: a determining module 601 is configured to determine that a Serving Gateway (SGW) needs to transmit buffered downlink data to a User Equipment (UE), in a Tracking Area Update (TAU) procedure; an initiating module 602 is configured to initiate a procedure of establishing a user-plane bearer for the UE.

Here the determining module 601 is configured to obtain an indication that the SGW needs to transmit buffered downlink data to the UE, and to determine that the SGW needs to transmit buffered downlink data to the UE, according to the indication; or to determine that a local timer does not expire, where the timer is started by the MME when the MME determines that the UE is unreachable, and indicates the SGW to buffer downlink data of the UE, and a timing length of the timer is a length of time T for which the MME indicates the SGW to buffer downlink data of the UE; or to determine that the time when a Context Request message of a new MME after relocation is received is earlier than a recorded timestamp, which is determined by the MME from a length of time for which the MME determines that the UE is unreachable to indicate the SGW to buffer downlink data of the UE; or which is the sum of the time when the MME determines that the UE is unreachable to indicates the SGW to buffer downlink data of the UE, and the length of time for which the MME indicates the SGW to buffer downlink data of the UE; or to determine that the time when a bearer related message of the SGW is received is earlier than a recorded timestamp, which is determined by the MME from a length of time for which the MME indicates the SGW to buffer downlink data of the UE in case of determining that the UE is unreachable; or which is the sum of the time when the MME indicates the SGW to buffer downlink data of the UE in a case of determining that the UE is unreachable, and the length of time for which the MME indicates the SGW to buffer downlink data of the UE.

In a particular implementation, the MME further includes a transmitting module 603 configured, if the MME needs to be changed in the TAU procedure, and it is determined that the local timer does not expire, to transmit the indication that the SGW needs to transmit buffered downlink data to the UE, to a new MME after the change in the TAU procedure, so that the new MME initiates the procedure of establishing a user-plane bearer for the UE.

In a particular implementation, the MME further includes a receiving module 604 configured, if the MME is a new MME in the TAU procedure, to receive an indication, transmitted by an old MME in the TAU procedure upon determining that a local timer does not expire, that the SGW needs to transmit buffered downlink data to the UE.

Here the indication that the SGW needs to transmit buffered downlink data to the UE is carried in a Modify Bearer Response message of the SGW.

Figure 7:
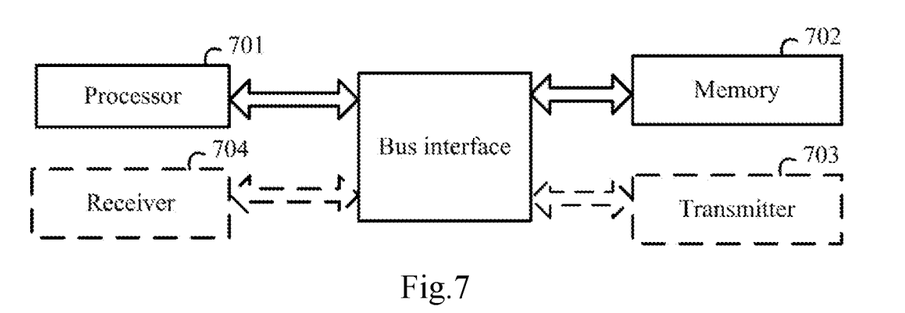
FIG. 7 is a schematic structural diagram of another MME according to an embodiment of the invention.

Based upon the same inventive idea, an embodiment of the invention further provides a MME, and for a particular implementation of the MME, reference can be made to the description of the MME in the embodiments of the methods above, so a repeated description thereof will be omitted here. As illustrated in FIG. 7, the MME generally includes a processor 701 and a memory 702, where preset program is stored in the memory 702, and the processor 701 is configured to read the preset program in the memory 702, and to perform following processes.

Determining that a Serving Gateway (SGW) needs to transmit buffered downlink data to a User Equipment (UE), in a Tracking Area Update (TAU) procedure.

Initiating a procedure of establishing a user-plane bearer for the UE.

Particularly the processor 701 is configured to determine that the SGW needs to transmit buffered downlink data to the UE in following manner.

Obtaining an indication that the SGW needs to transmit buffered downlink data to the UE, and determining that the SGW needs to transmit buffered downlink data to the UE, according to the indication; or determining that a local timer does not expire, where the timer is started by the MME when the MME determines that the UE is unreachable to indicate the SGW to buffer downlink data of the UE, and a timing length of the timer is a length of time T for which the MME indicates the SGW to buffer downlink data of the UE; or determining that the time when a Context Request message of a new MME after relocation is received is earlier than a recorded timestamp, which is determined by the MME from a length of time for which the MME indicates the SGW to buffer downlink data of the UE in a case of determining that the UE is unreachable; or which is the sum of the time when the MME indicates the SGW to buffer downlink data of the UE in case of determining that the UE is unreachable, and the length of time for which the MME indicates the SGW to buffer downlink data of the UE; or determining that the time when a bearer related message of the SGW is received is earlier than a recorded timestamp, which is determined by the MME from a length of time for which the MME indicates the SGW to buffer downlink data of the UE in a case of determining that the UE is unreachable; or which is the sum of the time when the MME indicates the SGW to buffer downlink data of the UE in case of determining that the UE is unreachable, and the length of time for which the MME indicates the SGW to buffer downlink data of the UE.

In a particular implementation, the MME further includes a transceiver 703.

If the MME needs to be changed in the TAU procedure, and the processor 701 is configured, upon determining that the local timer does not expire, to transmit the indication that the SGW needs to transmit buffered downlink data to the UE, to a new MME after the change in the TAU procedure through the transceiver 703, so that the new MME initiates the procedure of establishing a user-plane bearer for the UE.

In a particular implementation, the MME further includes a transceiver 703.

If the MME is a new MME in the TAU procedure, the processor 701 is configured receive through the transceiver 704 an indication, transmitted by an old MME in the TAU procedure upon determining that a local timer does not expire, that the SGW needs to transmit buffered downlink data to the UE.

Here the indication that the SGW needs to transmit buffered downlink data to the UE is carried in a Modify Bearer Response message of the SGW.

Figure 8:
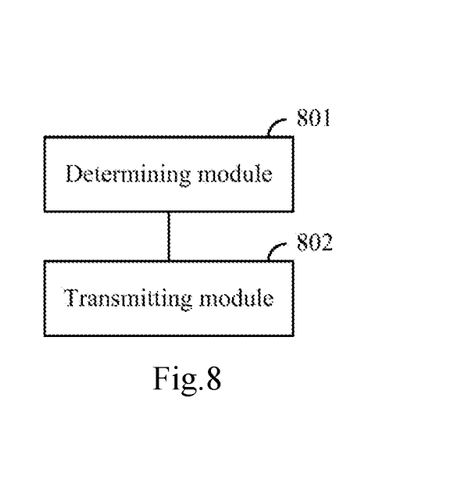
FIG. 8 is a schematic structural diagram of an SGW according to an embodiment of the invention.

Based upon the same inventive idea, an embodiment of the invention further provides a SGW, and for a particular implementation of the SGW, reference can be made to the description of the SGW in the embodiments of the methods above, so a repeated description thereof will be omitted here. As illustrated in FIG. 8, the SGW generally includes: a determining module 801 is configured to determine that there is buffered downlink data of a UE; a transmitting module 802 is configured to transmit to a Mobility Management Entity (MME) an indication that buffered downlink data need to be transmitted to the UE.

Here the determining module 801 is configured to determine that a local timer does not expire, where the operating length of the timer is transmitted by the MME when the MME determines that the UE is unreachable, and the timer is started upon reception of an indication for the SGW to buffer downlink data of the UE; or to determine downlink data in a local buffer to be transmitted to the UE.

Here the indication that buffered downlink data need to be transmitted to the UE is carried in a Modify Bearer Response message transmitted to the MME.

Figure 9:
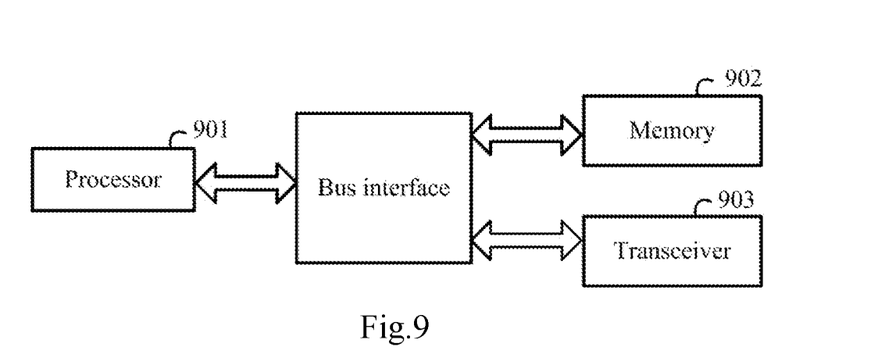
FIG. 9 is a schematic structural diagram of another SGW according to an embodiment of the invention.

Based upon the same inventive idea, an embodiment of the invention further provides a SGW, and for a particular implementation of the MME, reference can be made to the description of the SGW in the embodiments of the methods above, so a repeated description thereof will be omitted here. As illustrated in FIG. 9, the SGW generally includes a processor 901, a memory 902, and a transceiver 903, where the transceiver 903 is controlled by the processor 901 to operate, a preset program is stored in the memory 902, and the processor 901 is configured to read the preset program in the memory 902, and to perform following processes.

Determining that there is buffered downlink data of a UE.

Transmitting to a Mobility Management Entity (MME) through the transceiver 903 an indication that buffered downlink data need to be transmitted to the UE.

Here the processor 901 is configured to determine there is buffered downlink data of the UE in following manner.

Determining that a local timer does not expire, where the operating length of the timer is transmitted by the MME when the MME determines that the UE is unreachable, and the timer is started upon reception of an indication for the SGW to buffer downlink data of the UE; or determining downlink data in a local buffer to be transmitted to the UE.

Here the indication that buffered downlink data need to be transmitted to the UE is carried in a Modify Bearer Response message transmitted to the MME.

With the embodiments according to the embodiments of the invention, if the MME determines that the SGW needs to transmit buffered downlink data to the UE, in the TAU procedure, then the MME will initiate a procedure of establishing a user-plane bearer for the UE, thus avoiding the MME from initiating a user-plane establishment procedure between the UE and the eNB for transmitting downlink data of the UE buffered by the SGW, in the TAU procedure initiated by the UE after the downlink data of the UE buffered by the SGW are lost, so as to avoid an unnecessary signaling overhead.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for controlling a user-plane bearer to be established, the method comprises:
   determining, by a Mobility Management Entity, MME, whether a Serving Gateway, SGW, needs to transmit buffered downlink data to a User Equipment, UE, in a Tracking Area Update, TAU, procedure;
   in response to a determination that the SGW needs to transmit buffered downlink data to the UE in the TAU procedure, initiating, by the MME, a procedure of establishing a user-plane bearer for the UE;

in response to a determination that the SGW does not need to transmit buffered downlink data to the UE in the TAU procedure and the UE does not need to transmit uplink data in the TAU procedure, not initiating, by the MME, the procedure of establishing a user-plane bearer for the UE, wherein the determining, by the MME, that the SGW needs to transmit buffered downlink data to the UE comprises:

determining, by the MME, a time or receiving a Context Request message of a new MME which is relocated, is earlier than a recorded timestamp, the recorded timestamp is determined by the MME from a length of time for which the MME indicates the SGW to buffer downlink data of the UE in case of determining that the UE is unreachable; or the recorded timestamp is a sum of time when the MME indicates the SGW to buffer downlink data of the UE in a case of determining that the UE is unreachable, and a length of time for which the MME indicates the SGW to buffer downlink data of the UE; or determining by the MME, that a time when a bearer related message of the SGW is received is earlier than a recorded timestamp, which is determined by the MME from a length of time for which the MME indicates the SGW to buffer downlink data of the UE in a case of determining that the UE is unreachable, or which is a sum of a time when the MME indicates the SGW to buffer downlink data of the UE in a case of determining that the UE is unreachable, and a length of time for which the MME indicates the SGW to buffer downlink data of the UE.

2. The method according to claim 1, wherein if the MME is changed during the TAU procedure, then the method further comprises:

if the MME determines that the local timer does not expire, then transmitting the indication that the SGW needs to transmit buffered downlink data to the UE, to the new MME, so that the new MME initiates the procedure of establishing a user-plane bearer for the UE; or if the MME determines that a stored timestamp does not expire, then transmitting the indication that the SGW needs to transmit buffered downlink data to the UE, to the new MME, so that the new MME initiates the procedure of establishing a user-plane bearer for the UE.

3. The method according to claim 1, wherein if the MME is a new MME during the TAU procedure, then obtaining, by the MME, the indication that the SGW needs to transmit buffered downlink data to the UE comprises:

receiving, by the MME, an indication that the SGW needs to transmit buffered downlink data to the UE, the indication is transmitted by an old MME in the TAU procedure upon determining that a local timer does not expire; or receiving, by the MME, an indication that the SGW needs to transmit buffered downlink data to the UE, the indication is transmitted by an old MME in the TAU procedure upon determining that the SGW needs to transmit buffered data.

4. The method according to claim 1, wherein the indication that the SGW needs to transmit buffered downlink data to the UE is carried in a Modify Bearer Response message of the SGW.

5. A Mobility Management Entity, MME, comprising a memory configured to store computer readable programs and at a least one processor:

wherein the at least one processor is configured to execute the computer readable programs to:

determine whether a Serving Gateway, SGW, needs to transmit buffered downlink data to a User Equipment, UE, in a Tracking Area Update, TAU, procedure;

in response to a determination that the SGW needs to transmit buffered downlink data to the UE in the TAU procedure, initiate a procedure of establishing a user-plane bearer for the UE;

in response to that the SGW does not need to transmit buffered downlink data to the UE in the TAU procedure and the UE does not need to transmit uplink data in the TAU procedure, not initiate the procedure of establishing a user-plane bearer for the UE;

wherein the at least one processor is configured to execute the computer readable programs to determine whether that the SGW needs to transmit buffered downlink data to the UE in the TAU procedure by;

determining a time of receiving a Context Request message of a new MME which is relocated, is earlier than a recorded timestamp the recorded timestamp is determined by the MME from a length of time for which the MME indicates the SGW to buffer downlink data of the UE in a case of determining that the UE is unreachable; or the recoded timestamp is a sum of a time when the MME indicates the SGW to buffer downlink data of the UE in a case of determining that the UE is unreachable, and a length of time for which the MME indicates the SGW to buffer downlink data of the UE; or determining that a time when a bearer related message of the SGW is received is earlier than a recorded timestamp, which is determined by the MME from a length of time for which the MME indicates the SGW to buffer downlink data of the UE in a case of determining that the UE is unreachable; or which is a sum of a time when the MME indicates the SGW buffer downlink data of the UE in a case of determining that the UE is reachable, and a length of time for which the MME indicates the SGW to buffer downlink data of the UE.

6. The MME according to claim 5, wherein the at least one processor is further configured to execute the computer readable programs to:

if the MME is changed in the TAU procedure, and it is determined that the local timer does not expire transmit the indication that the SGW needs to transmit buffered downlink data to the UE, to the new MME, so that the new MME initiates the procedure of establishing a user-plane bearer for the UE; or if the MME is changed in the TAU procedure, and it is determined that a stored timestamp does not expire transmit the indication that the SGW needs to transmit buffered downlink data to the UE, to a new MME, so that the new MME initiates the procedure of establishing a user-plane bearer for the UE.

7. The MME according to claim 5, wherein the at least one processor is further configured to execute the computer readable programs to:

if the MME is a new MME in the TAU procedure, receive an indication that the SGW needs to transmit buffered downlink data to the UE, wherein the indication is transmitted by an old MME in the TAU procedure upon determining that a local timer does not expire; or if the MME is a new MME in the TAU procedure, to-receive an indication that the SGW needs to transmit buffered downlink data to the UE, wherein the indication is transmitted by an old MME in the TAU procedure upon determining that the SGW needs to transmit buffered data.

8. The MME according to claim 5, wherein the indication that the SGW needs to transmit buffered downlink data to the UE is carried in a Modify Bearer Response message of the SGW.

* * * * *